(12) United States Patent
Smith et al.

(10) Patent No.: US 9,376,651 B2
(45) Date of Patent: *Jun. 28, 2016

(54) SOIL RESISTANT FLOOR TREATMENT

(75) Inventors: Kim R. Smith, Woodbury, MN (US); Catherine Hanson, Hastings, MN (US); Minyu Li, Oakdale, MN (US); Andrew S. Wold, Wayzata, MN (US); Mark D. Levitt, Lake Elmo, MN (US)

(73) Assignee: Ecolab USA Inc., St. Paul, MN (US)

( * ) Notice: Subject to any disclaimer, the term of this patent is extended or adjusted under 35 U.S.C. 154(b) by 953 days.

This patent is subject to a terminal disclaimer.

(21) Appl. No.: 13/304,922

(22) Filed: Nov. 28, 2011

(65) Prior Publication Data

US 2012/0145188 A1    Jun. 14, 2012

Related U.S. Application Data

(60) Provisional application No. 61/422,373, filed on Dec. 13, 2010, provisional application No. 61/422,376, filed on Dec. 13, 2010.

(51) Int. Cl.

| | |
|---|---|
| C09G 1/16 | (2006.01) |
| C11D 3/37 | (2006.01) |
| G09G 1/16 | (2006.01) |
| C11D 11/00 | (2006.01) |
| E04F 15/08 | (2006.01) |

(52) U.S. Cl.
CPC .......... *C11D 3/3765* (2013.01); *C11D 11/0023* (2013.01); *G09G 1/16* (2013.01); *E04F 15/08* (2013.01); *Y10T 428/249991* (2015.04); *Y10T 428/31855* (2015.04)

(58) Field of Classification Search
None
See application file for complete search history.

(56) References Cited

U.S. PATENT DOCUMENTS

| | | | |
|---|---|---|---|
| 2,496,358 A * | 2/1950 | Ross et al. | 549/255 |
| 2,674,619 A | 4/1954 | Lundsted | |
| 2,677,700 A | 5/1954 | Jackson et al. | |
| 2,865,877 A * | 12/1958 | Hatton et al. | 524/340 |
| 2,903,486 A | 9/1959 | Brown et al. | |
| 2,972,592 A | 2/1961 | Brown et al. | |
| 3,048,548 A | 8/1962 | Martin et al. | |
| 3,308,078 A | 3/1967 | Rogers et al. | |
| 3,382,178 A | 5/1968 | Lissant et al. | |
| 3,480,580 A * | 11/1969 | McConnell et al. | 525/263 |
| 3,574,124 A | 4/1971 | Lyness et al. | |
| 3,598,778 A * | 8/1971 | Burdick et al. | 524/549 |
| 3,664,961 A | 5/1972 | Norris | |
| 3,785,860 A | 1/1974 | Zdanowski | |
| 3,793,275 A | 2/1974 | Corey et al. | |
| 3,859,386 A * | 1/1975 | Mainord | 562/590 |
| 3,917,552 A | 11/1975 | Bischoff et al. | |
| 3,929,678 A | 12/1975 | Laughlin et al. | |
| 4,017,662 A | 4/1977 | Gehman et al. | |
| 4,363,753 A | 12/1982 | Bozon et al. | |
| 4,363,756 A | 12/1982 | Sepulveda et al. | |
| 4,565,647 A | 1/1986 | Llenado | |
| 4,613,679 A | 9/1986 | Mainord | |
| 4,725,319 A | 2/1988 | Osberghaus | |
| 4,869,934 A | 9/1989 | Jethwa | |
| 4,877,691 A | 10/1989 | Cockrell, Jr. | |
| 4,909,962 A | 3/1990 | Clark | |
| 5,137,793 A | 8/1992 | Cockrell, Jr. | |
| 5,290,954 A | 3/1994 | Roberts et al. | |
| 5,407,700 A | 4/1995 | Man et al. | |
| 5,458,532 A | 10/1995 | Cannone | |
| 5,460,887 A * | 10/1995 | Pechhold | 428/395 |
| 5,534,184 A | 7/1996 | Underwood | |
| 5,605,493 A | 2/1997 | Donatelli et al. | |
| 5,683,143 A | 11/1997 | Peterson et al. | |
| 5,707,708 A | 1/1998 | Pechhold | |
| 5,753,604 A | 5/1998 | Soldanski et al. | |
| 5,834,088 A | 11/1998 | Pechhold | |
| 5,854,197 A * | 12/1998 | Duccini et al. | 510/434 |
| 5,945,472 A | 8/1999 | Duong et al. | |
| 6,180,592 B1 | 1/2001 | Smith et al. | |
| 6,223,383 B1 | 5/2001 | VanPutten | |
| 6,234,886 B1 | 5/2001 | Rivard et al. | |
| 6,261,164 B1 | 7/2001 | Rivard et al. | |
| 6,326,344 B1 | 12/2001 | Levitt | |
| 6,403,546 B1 | 6/2002 | Hernandez et al. | |
| 6,701,940 B2 | 3/2004 | Tsibouklis et al. | |
| 7,033,258 B2 | 4/2006 | Jordan | |
| 7,132,479 B2 | 11/2006 | Engelhardt et al. | |
| 7,204,745 B2 | 4/2007 | Thysell | |
| 7,465,744 B2 | 12/2008 | Starck et al. | |

(Continued)

FOREIGN PATENT DOCUMENTS

| | | |
|---|---|---|
| EP | 0449509 B1 | 10/1991 |
| EP | 0458591 B1 | 11/1991 |

(Continued)

OTHER PUBLICATIONS

Translation of WO 2009/156254, Dec. 2009.*
Definition of "detergent", p. 357 of Hawley's Condensed Chemical Dictionary, 12$^{th}$ Edition, 1993.*
Chen, Wei et al., "Ultrahydrophobic and Ultralyophobic Surfaces: Some Comments and Examples", langmuir, Apr. 24, 1999, 15 (10), pp. 3395-3399. http://pub.acs.org.proxy.lib.uiowa.edu/doi/full/1 0.1 021/1 a990074s, [retrieved on Aug. 24, 2011].

(Continued)

*Primary Examiner* — Erma Cameron
(74) *Attorney, Agent, or Firm* — Amy J. Hoffman

(57) ABSTRACT

A soil resistant floor surface treatment composition is provided. In particular, a composition comprises a maleic/olefin copolymer and an optional cleaning agent. Methods for treating a porous floor surface with a soil resistant agent and kits comprising a floor treatment composition, an applicator, a removal agent for removing a plurality of soils from a treated surface, and instructions for use are further provided by the present invention.

12 Claims, No Drawings

(56) References Cited

U.S. PATENT DOCUMENTS

| | | | |
|---|---|---|---|
| 7,550,199 | B2 | 6/2009 | Hopkins et al. |
| 7,655,609 | B2 | 2/2010 | Torres et al. |
| 7,776,108 | B2 | 8/2010 | Shah et al. |
| 8,206,511 | B2 | 6/2012 | Collazo-Martinez et al. |
| 8,222,196 | B2 | 7/2012 | Smith et al. |
| 2005/0096239 | A1 | 5/2005 | Barnabas et al. |
| 2005/0172428 | A1 | 8/2005 | Thysell |
| 2006/0128585 | A1 | 6/2006 | Adair et al. |
| 2006/0160953 | A1 | 7/2006 | Wautier et al. |
| 2006/0211340 | A1 | 9/2006 | Thysell |
| 2007/0099549 | A1 | 5/2007 | Palushaj |
| 2007/0128989 | A1 | 6/2007 | Jentgens et al. |
| 2007/0179265 | A1* | 8/2007 | Albers et al. ............... 526/286 |
| 2007/0207922 | A1 | 9/2007 | Haindl et al. |
| 2007/0215184 | A1 | 9/2007 | Jonke et al. |
| 2007/0253926 | A1* | 11/2007 | Tadrowski et al. ......... 424/70.13 |
| 2008/0004203 | A1* | 1/2008 | Scheuing et al. ............ 510/475 |
| 2008/0146734 | A1 | 6/2008 | Youngblood et al. |
| 2008/0248989 | A1 | 10/2008 | Holderbaum et al. |
| 2008/0276967 | A1* | 11/2008 | Smith et al. ..................... 134/18 |
| 2008/0313819 | A1 | 12/2008 | Penninger et al. |
| 2009/0170744 | A1 | 7/2009 | Meine et al. |
| 2009/0311302 | A1 | 12/2009 | Youngblood et al. |
| 2009/0317621 | A1 | 12/2009 | Youngblood et al. |
| 2010/0004152 | A1 | 1/2010 | Karagianni et al. |
| 2012/0077045 | A1 | 3/2012 | Smith et al. |
| 2012/0088420 | A1 | 4/2012 | Smith et al. |
| 2012/0148830 | A1 | 6/2012 | Smith et al. |
| 2012/0149623 | A1 | 6/2012 | Li et al. |

FOREIGN PATENT DOCUMENTS

| | | |
|---|---|---|
| EP | 0627281 A2 | 12/1994 |
| EP | 0562730 B1 | 10/1996 |
| EP | 0845326 B1 | 6/1998 |
| EP | 1186379 B1 | 3/2002 |
| EP | 1292428 B1 | 3/2003 |
| EP | 1524077 B1 | 4/2005 |
| EP | 1702714 B1 | 9/2006 |
| GB | 0973294 A | 10/1964 |
| GB | 1082153 A | 9/1967 |
| GB | 1141943 A | 2/1969 |
| GB | 1163852 A | 9/1969 |
| GB | 1528592 A | 10/1978 |
| JP | 1148416 A | 2/1999 |
| JP | 2001192983 A | 7/2001 |
| JP | 2005023149 A | 1/2005 |
| WO | WO9420264 A1 | 9/1994 |
| WO | WO0123518 A1 | 4/2001 |
| WO | WO2005071030 A2 | 8/2005 |
| WO | WO2006021529 A1 | 3/2006 |
| WO | WO2006097141 A1 | 9/2006 |
| WO | WO2007117952 A1 | 10/2007 |
| WO | WO2009074124 A2 | 6/2009 |
| WO | WO2009/143513 | 11/2009 |
| WO | WO2009/156254 | * 12/2009 |
| WO | WO2010/065481 | 6/2010 |

OTHER PUBLICATIONS

Clyde Hygiene Company, Norfresh Concentrated Floor Maintainer, printed Jan. 2, 2008, 2 pages.
Floor Safety Products, Copyright © 2006 Xtreme Traction, 3 pages.
Floortop Floor Cleaner & Maintainer, Concentrated cleaner for cleaning and maintenance of hard floors, www.pgprof.com, 1 page.
Friction™ Slip Resistant Cleaner & Polish, Nu-Safe Floor Solutions, Inc., printed Oct. 5, 2004, 1 page.
GreenerDesign Staff, "Purdue Scientists Develop 'Self-Cleaning' Coatings that Repel Oil", GreenerDesign Staff, Created Aug. 18, 2009; http://www.greenbiz.com/prinU270n, 2 pages, [retrieved on Aug. 20, 2010].
Howarter, John A. et al., "Amphiphile grafted membranes for the separation of oil-in-water dispersions", Journal of Colloid and Interface Science 329 (2009) 127-132 (published online Oct. 1, 2008).
Howarter, John A. et al., "Hydrophilic-oleophobic stimuli-responsive materials and surfaces" Abstract, 1 page, http://docs.lib.purdue.edu/dissertations/AAI3373153/, [retrieved on Aug. 24, 2011].
Howarter, John A. et al., "Oleophobic membranes of enhanced coalescence and separation in oil-in-water systems" POLY 7, Abstract, 1 page, Aug. 16, 2009, http://oasys2.confex.com/acs/238nm/techprogram/P1299044.htm, retrieved on Aug. 23, 2011].
Howarter, John A. et al., "Self-Cleaning and Anti-Fog Surfaces via Stimuli-Responsive Polymer Brushes**" Adv. Mater. Oct. 31, 2007, 19,3838-3843.
Howarter, John A. et al., "Self-Cleaning and Next Generation Anti-Fog Surfaces and Coatings", Macromol. Rapid Commun. 2008, 29, 455-466.
Howarter, John A. et al., "Surface Modification of Polymers with 3-Aminopropyltriethoxysilane as a General Pretreatment for Controlled Wettability", Macromolecules, Jan. 30, 2007, 40, 1128-1132.
Howarter, John A. et al., "Surfactant modified membranes for the separation of oil-in-water emulsions" POLY 705, Abstract, 1 page, Apr. 10, 2008, http://oasys2.confex.com/acs/235nm/techprogram/P11150723.htm, [retrieved on Aug. 24, 2011].
Howarter, John A. et al., "Synthesis and characterization of bulk self-cleaning polymers" POLY 104 Abstract, 1 page, Apr. 6, 2008, http://oasys2.confex.com/acs/235nm/techprogram/P1139556.htm, [retrieved on Aug. 24, 2011].
International Search Report and Written Opinion issued in PCT/IB2010/054508, dated Jul. 27, 2011, 8 pages.
Ober, Christopher K. et al., "Block copolymers as surface modifiers: Synthesis, characterization, and relevance to fouling release and biostability" PMSE 353 Abstract, 1 page, Mar. 27, 2003, http://oasys2.confex.com/acs/225nm/techprogram/P609111.htun, [retrieved on Aug. 24, 2011].
Ober, Christopher K. et al., "Surface-Active Materials with Antifouling Properties", Proceedings published 2004 by the American Chemical Society, 2 pages.
Slip Control, R20 Floor Cleaner-Polisher-Non-Slip, Copyright © 2004 SlipControl.com, last modified Mar. 15, 2006, 4 pages.
Stop Slip Floor Cleaner and Traction Treatment, manufactured by Johnson Diversey, © 2006 Dadepaper Company, 1 page.
Stratton, Thomas R. et al, "In Vitro Biocompatibility Studies of Antibacterial Quaternary Polymers" Biomacromolecules Aug. 27, 2009, 10, 2550-2555.
Stratton, Thomas R. et al., "Activity and biocompatibility of poly(vinyl pyridine)-based copolymers" PMSE 207 Abstract, Apr. 8, 2008, 1 page, http://oasys2.confex.com/acs/235nm/techprogram/P1158850.htm, [retrieved on Aug. 24, 2011].
Stratton, Thomas R. et al., "Biocompatibility of quaternary poly(vinyl pyridine)-based bactericidal copolymers as determined by invitro assays of human epithelium" POLY 180 Abstract, 1 page, Aug. 17, 2009, http://oasys2.confex.com/acs/238nm/techprogrann/P1297760.htm, [retrieved on Aug. 23, 2011].
Youngblood, Jeffrey P. et al., "Coatings Based on Side-chain Ether-linked Poly(ethylene glycol) and Fluorocarbon Polymers for the Control of Marine Biofouling", Biofouling, Apr. 19, 2003, vol. 19 (Supplement), pp. 91-98.
Youngblood, Jeffrey P. et al., "Plasma polymerization using solid phase polymer reactants (non-classical sputtering of polymers)", Thin Solid Films, vol. 382, Issues 1-2, Feb. 14, 2001, pp. 95-100.
Youngblood, Jeffrey P. et al., "Bioinspired Materials for Self-Cleaning and Self-Healing" MRS Bulletin, vol. 33, Aug. 2008, www.mrs.org/bulletin, pp. 732-741.
Youngblood, Jeffrey P. et al., "Hydrophilic and oleo phobic stimuli-responsive surfaces" POLY 76 Abstract, 1 page, Mar. 25, 2007, http://oasys2.confex.com/acs/233nm/techprogram/P1 049953.htm, [retrieved on Aug. 24, 2011].
Youngblood, Jeffrey P. et al., "New materials for marine biofouling resistance and release: Semifluorinated and PEGylated block copolymer bilayer coatings" PMSE 351 Abstract, 1 page, Mar. 27, 2003, http://oasys2.confex.com/acs/225nm/techprogram/P595545.htm, [retrieved on Aug. 24, 2011].

* cited by examiner

SOIL RESISTANT FLOOR TREATMENT

CROSS-REFERENCE TO RELATED APPLICATIONS

This application claims the benefit under 35 U.S.C. §119 (e) to U.S. Provisional Patent Application No. 61/422,373, entitled "Soil Resistant Floor Cleaner," and U.S. Provisional Patent Application Ser. No. 61/422,376, entitled "Soil Resistance Floor Treatment," each of which were filed on Dec. 13, 2010. The entire contents of these patent applications are hereby expressly incorporated herein by reference including, without limitation, the specification, claims, and abstract, as well as any figures, tables, or drawings thereof.

This application is related to U.S. Pat. No. 8,585,829, entitled "Soil Resistant Floor Cleaner," and U.S. patent Application Publication Number U.S. 2012-0148830 A1, entitled "Soil Resistant Floor Treatment," each of which are filed on even date herewith. This application is also related to U.S. patent application Ser. No. 13/304,846, entitled "Soil Resistant Cleaner and Surface Treatment," and U.S. patent application Ser. No. 13/304,844, entitled "Soil Resistant Surface Treatment," each of which are filed on even date herewith and each of which is a continuation-in-part application of U.S. application Ser. No. 12/617,121 filed on Nov. 12, 2009, entitled "Composition and Method for Removal of Polymerized Non-Trans Fats" issued as U.S. Pat. No. 8,222,196. This application is also related to U.S. Provisional Patent Application Ser. No. 61/422,278, entitled "Acrylate-Olefin Co-Polymers as Soil Resistant Surface Treatment," U.S. Provisional Patent Application Ser. No. 61/422,280, entitled "Acrylates as Soil Resistant Surface Treatment," and U.S. Provisional Patent Application Ser. No. 61/422,282, entitled "Soil Resistant Surface Treatment," each of which were filed on Dec. 13, 2010. The entire contents of these patent applications are hereby expressly incorporated herein by reference including, without limitation, the specification, claims, and abstract, as well as any figures, tables, or drawings thereof.

FIELD OF THE INVENTION

The invention relates to soil resistant floor surface treatments. In particular, the invention relates to floor treatment compositions, kits and methods of cleaning surfaces using the compositions.

BACKGROUND OF THE INVENTION

A variety of compositions are available for cleaning and/or treating stone surfaces such as concrete, terrazzo and marble to reduce soil contamination. Conventional floor treatments, such as StoneMedic Absorbent Stone Impregnator™ (ASI) from Ecolab are applied as a concentrated liquid. The floor treatments may be allowed to stand on the floor surface for several minutes before the excess liquid is removed, and the treated floor may be re-opened traffic several hours after the application. It would be beneficial to provide a surface treatment that resists soil contamination and staining, but does not require special application procedures or long drying times.

BRIEF SUMMARY OF THE INVENTION

In an embodiment, the present invention is a method for treating a floor surface. The method includes applying to the floor surface an aqueous solution comprising about 0.005 wt % to about 20 wt % of a maleic/olefin copolymer composition having a molecular weight of about 1,000 to about 20,000 g/mol. The method also includes drying the surface such that a coating or layer including the copolymer is disposed on the surface.

In another embodiment, the present invention is a floor treatment composition. The floor cleaning composition includes: 1) at least one maleic/olefin copolymer having a molecular weight of about 1,000 to about 20,000 g/mol; 2) optionally, at least one amphoteric acrylic copolymer; and 3) optionally, at least one detergent. A treatment system comprising first and second containers including the maleic/olefin copolymer and detergent, respectively is also provided. Optionally, the at least one amphoteric acrylic copolymer may be provided in the first container, the second container, or in a third container.

In another embodiment, the present invention is a laminate that includes a floor substrate having a surface and a coating or layer disposed on the surface. The coating or layer includes at least one anti-soil agent comprising a maleic/olefin copolymer. The floor surface may be porous or non-porous.

DETAILED DESCRIPTION OF THE PREFERRED EMBODIMENT

Embodiments of this invention include soil resistant floor treatment compositions, articles, methods of use, and kits or cleaning systems, which can vary as understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

The term "weight percent," "wt %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt %," etc.

According to an embodiment of the invention a novel stain resistant floor treatment composition, treated article and methods of use of the same are provided. The stain resistant floor treatment composition provides stain resistant activity that may facilitate the removal of soil by simple mechanical means, such as a water spray, air flow and/or mechanical means alone. In addition, treated floor surfaces reduce the intensity and frequency of required cleaning activities making the treated surface easier to clean. The soil resistant floor treatment composition of the invention can be applied to a wide variety of varying porosity floor surfaces, including marble, granite, terrazzo, concrete, dry shake, ceramic tiles, wood, laminate, linoleum, vinyl, cork, bamboo and rubber. Porous stone floor surfaces such as concrete, terrazzo, dry shake and ceramic flooring surfaces may be particularly suitable for treatment.

Additionally, the soil resistant floor treatment composition of the present invention can be applied to porous or non-porous flooring surfaces having a coating. Examples of coatings include but are not limited to factory-applied coatings, jobsite-applied coatings, and floors treated with restorers. Factory-applied coatings are applied to the flooring substrates before the substrate pieces are installed at a jobsite. Jobsite-applied coatings are applied to the flooring substrates after the substrate pieces have been installed. Restorers are applied to the coated floor surfaces as an interim maintenance step instead of scrubbing or stripping the floor of previous coatings and applying a new coating. The coating may include one component or multi component systems which may be applied as single or multiple layers. Finishes used for coating a floor surface and/or substrate include acrylic, polyurethanes, epoxy coatings, UV curable compositions, and aziridine crosslinked floor finishes. Examples of acrylic-based coatings include Gemstar Stratus, GemStar Laser, and Taj Mahal from Ecolab. Examples of polyurethane-based coatings include Maxx Durable and the Courtmaster II System from Ecolab.

Compositions

In one embodiment, the stain resistant floor treatment composition comprises, consists essentially of or consists of at least one soil resistant agent. A soil resistant agent refers to a chemical agent that reduces the severity of a stain (e.g., repels staining) on a floor surface caused by soil contact, and/or promotes easier stain removal (e.g., releases stains) from a floor surface by decreasing the penetration and/or adhesion of soil on the surface through floor surface modification or other physical or chemical mechanisms.

Particularly suitable soil resistant agents include polycarboxylate copolymers of maleic/olefin and their salts and derivates, more particularly, a derivative having a maleic/hydrophobically-modified olefin copolymer. The olefin segment may include a variety of linear, branched and cyclic alkenes. Suitable alkenes may include or be derived from propylene, ethylene, or butylene. Particularly suitable alkenes may include or be derived from butylene, for example, isobutylene and diisobutylene. Other suitable stain resistant agents include silicone materials such as polydimethysiloxane materials (e.g., Wacker HC303 from Wacker Silicones), fluorochemical materials (e.g., Capstone ST100 and ST300 from Dupont), polycarboxylate copolymers (e.g., Acusol 460 from Dow), and acrylic polymers (Rhoplex EZ Clean 200 from Dow, Polyquart® Pro, Polyquart® Ampho 149, and PolyQuart® EcoClean from Cognis). Any combination of the foregoing agents may also be used to provide enhanced stain resistance. According to one embodiment, the soil resistant agent is substantially free of fluorinated or silicone substituents. According to a further embodiment the maleic/hydrophobicly-modified olefin copolymer does not exhibit viscosity-building or any threshold activity. According to one embodiment the composition is substantially free or free of volatile organic compounds. According to a still further embodiment the composition is substantially free or free of alkali soluble resins, plasticizers, solvents such as volatile organic compound containing (VOC) solvents, and waxes. According to a still further embodiment the composition is substantially free or free of threshold agents and/or rheology modifiers.

The stain resistant floor treatment composition may further comprise additional soil resistant agents to provide improved and/or synergistic soil resistance. These additional soil resistant agents can have a beneficial impact on gloss as well. Suitable additional soil resistant agents include acrylic copolymers. Particularly suitable acrylic copolymers are amphoteric acrylic copolymers and have molecular weights of at least 5,000 g/mol, more particularly, at least 10,000 g/mol. The weight ratio of acrylic copolymer to the maleic/olefin copolymer may be, for example, from 0.02:1 to 5:1 (where all the materials are 100% active), particularly, from approximately 0.05:1 to 3:1, more particularly, from approximately 0.05:1 to 2:1, and more particularly, from approximately 0.05:1 to 1:1. Suitable commercially available acrylic copolymers include Polyquart® Pro, Polyquart® Ampho 149, and PolyQuart® EcoClean, which are available from Cognis Corporation. As discussed further below, it has been found that Polyquart® Pro and Polyquart® Ampho 149 can be used in combination with other soil resistant agents disclosed herein to provide soil resistant capability that is better than the stain resistance achieved when either agent is used alone.

In some embodiments, the maleic/olefin copolymer has a low molecular weight, preferably less than approximately 20,000 g/mol, preferably less than 10,000 g/mol, more preferably less than about 7,000 and still more preferably less than about 3,000. According to another embodiment of the invention, the copolymer has a molecular weight from approximately 1,000 to 20,000 g/mol, from approximately 2,000 to 10,000 g/mol, or from approximately 2,000 to 5,000 g/mol. The term "molecular weight," as used herein with reference to the molecular weight of polymers and copolymers, refers to the calculated average molecular weight value of the polymer or copolymer, which one skilled in the art will appreciate to encompass a reasonable percent error as a result of the statistical method applied for such calculation and the variations in the polymer molecules.

Exemplary maleic/olefin copolymers such as Sokalon CP9 and ES8804 are sodium salts produced by BASF. The maleic/olefin copolymer has a maleic/olefin molar ratio from approximately 1:4 to 4:1, preferably from approximately 1:2 to 2:1, more preferably approximately 1:1. In one embodiment, the maleic/olefin copolymer has a molecular weight between approximately 1,000 to 20,000 g/mol and has a maleic/olefin molar ratio from approximately 1:4 to 4:1, preferably from approximately 1:2 to 2:1, more preferably approximately 1:1. In another embodiment, the maleic/olefin copolymer has a molecular weight between approximately 2,000 to 10,000 g/mol and has a maleic/olefin molar ratio from approximately 1:4 to 4:1, preferably from approximately 1:2 to 2:1, more preferably approximately 1:1. According to a further preferred embodiment, the olefin contains an alkyl group having more than 3 carbons, preferably more than 4 carbons. The glass transition temperature of the maleic/olefin copolymer is above the use temperature of the copolymer, preferably above 10° C., and more preferably above 20° C. In some embodiments, a dried film of the maleic/olefin copolymer exhibits an oil/water contact angle ratio of the laminate surface of at least 2.

The resulting composition can be homogeneous or non homogeneous, can be in the form of solid, liquid including emulsion or dispersion, gel, and paste, can be a single part or multi part package. The composition may also include additional functional materials disclosed below.

A further embodiment of the invention includes a laminate composition comprising, consisting essentially of or consisting of a porous or non-porous floor surface and at least one continuous or non-continuous coating or layer of the composition adhered to the floor surface by a physical or chemical bond including, for example, by ionic or covalent bonding. In one embodiment, the laminate comprises a floor substrate surface as a bottom layer and a layer of a soil resistant composition comprising the copolymer of maleic/olefin disclosed herein as a top layer. In another embodiment, a coating is disposed between the bottom floor substrate surface and the top soil resistant composition layer. The treated floor may be provided by applying the composition to a floor surface or by embedding the composition into the pore structure of the treated floor. In a further example, the soil resistant composition can be embedded in a continuous or non-continuous coating on the floor surface.

The soil resistant floor treatment compositions of the invention and the treated surfaces are stable over a relatively wide range of pH values, e.g., between about 3 and about 14. If desired, the soil resistant floor treatment composition can be removed by those skilled in the art by a variety of techniques that can be employed to bring about such removal. One convenient method is by spraying or soaking the treated surface with a removal solution.

In addition to using at least one soil resistant agent as a stand-alone floor treatment, a cleaning agent may be added to provide a detergent composition with stain resistant capability. For example, the cleaning agent may be formed of amines, fatty acids, alkaline sources, salts, solvents, surfactants or combinations thereof. In one embodiment, the cleaning agent is a fatty acid salt formed by the combination of a fatty acid and an alkalinity source. Alkali metals include alkali metals (Group 1 of periodic table) such as Lithium, Sodium, and Potassium and alkali earth metals (Group 2 of periodic table) such as Magnesium and Calcium. The term "alkali metals" is used herein to refer to both alkali metals and alkali earth metals. In one particular embodiment, the cleaning agent may be formed of fatty acid(s) and alkali metal hydroxide(s), fatty acid(s) and alkali metal carbonate(s), and/or fatty acid(s) and amine(s). For example, the cleaning agent may be a mixture of oleic acid and monoethanolamine (MEA), or a mixture of fatty acids, such as palm kernel and tall oil, and potassium hydroxide. Although the singular form of fatty acid, fatty acid salt and alkaline source may be used herein, one skilled in the art will recognize that the a combination of different fatty acids, fatty acid salts and/or alkalinity sources may be used.

The term "fatty acid" includes any of a group of carboxylic acids that can be derived from or contained in an animal or vegetable fat or oil. Fatty acids are composed of a chain of alkyl groups and characterized by a terminal carboxyl group. The alkyl groups can be linear or branched. The fatty acid can be saturated or unsaturated. In some embodiments, the chain of alkyl groups contain from 4 to 24 carbon atoms, particularly from 6 to 24 carbon atoms, and more particularly from 12 to 18 carbon atoms. The detergent composition can include combinations or mixtures of different fatty acids. Examples of suitable fatty acids include oleic acid, palmitic acid, palm kernel fatty acid, coconut fatty acid, tall oil fatty acid, and stearic fatty acid, but a broad variety of other fatty acids or combinations or mixtures thereof are contemplated for use. Examples of suitable fatty acid-containing detergent compositions include StoneMedic Daily Cleaner Conditioner (DCC), NeoMat Forte and NeoMat S, which are aqueous soap based cleaners all available from Ecolab.

When a fatty acid is used as the cleaning agent in the detergent composition, the detergent composition can include an effective amount of one or more alkaline sources to enhance cleaning of a floor surface and improve soil removal performance of the detergent composition. As referred to herein "fatty acid salt" refers to a fatty acid(s) and one or more alkaline sources. The alkaline source can be added at such an amount to fully or partially neutralize the fatty acid(s). In some cases, the alkalinity source may be added in excess. In general, it is expected that the composition may include the alkaline source in an amount (active) of at least about 0.1% by weight, at least about 5% by weight, or at least about 10% by weight.

Examples of suitable alkaline sources for the fatty acid salt of the detergent composition include, but are not limited to alkali metal carbonates, alkali metal hydroxides, and amines Alkali metals include alkali metals (Group 1 of periodic table) such as Lithium, Sodium, and Potassium and alkali earth metals (Group 2 of periodic table) such as Magnesium and Calcium. The term "alkali metals" is used herein to refer to both alkali metals and alkali earth metals. Exemplary alkali metal carbonates that can be used include, but are not limited to: sodium or potassium carbonate, bicarbonate, sesquicarbonate, and mixtures thereof. Exemplary alkali metal hydroxides that can be used include, but are not limited to sodium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45%, a 50% and a 73% by weight solution. It is preferred that the alkali metal hydroxide is added in the form of an aqueous solution, particularly a 45% by weight hydroxide solution, to reduce the amount of heat generated in the composition due to hydration of the solid alkali material. Although the singular form of fatty acid, fatty acid salt and alkaline source may be used herein, one skilled in the art will recognize that one or more fatty acids, fatty acid salts and/or alkalinity sources may be present.

Amines are organic derivatives of ammonia in which one or more of the ammonia hydrogens are replaced by alkyl or aromatic groups. A variety of organic amines may be employed in the compositions and methods of the present invention. Representative organic amines include alkyl amines, which may be primary, secondary, or tertiary, such as isopropylamine, ethylmethylamine and trimethylamine, or substituted organoamines (e.g., alkanolamines) such as monoethanolamine, diethanolamine and triethanolamine, 1,2-diaminoethane, 1,2-diaminopropane, N-benzylethanolamine, 2-aminomethylpropanol, furfurylamine, tetrahydrofurfurylamine and the like, and mixtures thereof, or isopropanolamines such as monoisopropanolamine, diisopropanolamine, triisopropanolamine and the like, and mixtures thereof, or aliphatic ether amines such as the Tomamine Ether PA Series and DA Series from Air Products and the like, and mixtures thereof, or cyclic amines such as morpholine, or ethoxylate amines such as ethoxylated tallow amine, ethoxylated coconut amine, ethoxylated alkyl propylene amines, the Tomamine Ether E-Series from Air Products and the like, and mixtures thereof, or amino alcohol such as 2-amino-2-methyl-1-propanol and the like and mixtures thereof. In particular, the amine may be an organoamine which may be accompanied by other amines or by salts of the amines.

In addition to the first alkaline source, the detergent composition may comprise a secondary alkaline source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkaline agents are commonly available in either aqueous or powdered form, either of which is useful in formulating the detergent compositions.

The cleaning agent is present in an amount effective to provide detersive properties. More specifically, the molar ratio of the fatty acid and alkaline source are present in an amount effective to provide detersive properties. An effective amount should be considered as an amount that provides a use composition having a wide pH range of between about 3 and about 14, particularly between about 5 and 10, and more particularly between about 7 and about 9.5. Additional pH adjusting agents may be used to provide the use composition with the desired pH. Suitable pH adjusting agents for such alkaline-based compositions include organic and inorganic acids, such as acetic acid, hydrochloric acid, sulfuric acid and citric acid.

The soil resistant composition for floor treatment can be in the form of liquid, paste, gel or solid. The compositions can be used as provided, or can be diluted with water prior to the applications.

Additional Functional Materials

The soil resistant composition can include additional components or agents, such as additional functional materials. As such, in some embodiments, the soil resistant composition including 1) at least one maleic/olefin copolymer having a molecular weight of about 1,000 to about 20,000 g/mol; 2) optionally, at least one amphoteric acrylic copolymer; and 3) optionally, at least one detergent may provide a large amount, or even all of the total weight of the detergent composition. For example, in embodiments having few or no additional functional materials disposed therein. The functional materials provide desired properties and functionalities to the soil resistant composition. For the purpose of this application, the term "functional materials" includes a material that when dispersed or dissolved in a use and/or concentrate solution, such as an aqueous solution, provides a beneficial property in a particular use.

Example functional materials include but are not limited to solvents, surfactants, polymers, fragrances, chelating agents such as ethylene diamine tetraacetic acid (EDTA) and its sodium salts; pH adjusters such as amines, acids and pH buffers; foam modifiers such as silicone defoamers; coloring agents, such as dyes; pearlising agents; wetting agents; stabilizers; and rheology modifiers.

Methods of Use

An embodiment of the invention includes a method for treating a clean surface comprising, consisting essentially of or consisting of applying the soil resistant floor treatment composition to a flooring surface, and drying the floor surface to form a laminate composition. According to a further embodiment, the method comprises, consists essentially of or consists of applying to a floor surface an aqueous solution of approximately 0.005% to 20% maleic/olefin copolymer soil resistant composition, wherein said copolymer has a molecular weight from approximately 1,000 to 20,000 g/mol, and drying the composition to form a laminate of the soil resistant composition and the floor surface. The treated floor surface can then be cleaned with a floor cleaner. For example, the treated floor surface can be cleaned to remove soil.

Depending on the specific composition used, the treated floor surface may result from a physical bond or chemical bond/interaction (e.g., hydrogen, ionic, or covalent bonding) of the stain resistant composition to the floor surface. Methods according to the invention may further include combining the at least one soil resistant agent with a detergent composition in order to clean a surface suitable for treatment with the soil resistant composition and leaving a residue, such as a coating or layer of the soil resistant agent, on the clean surface. According to a further embodiment, the soil resistant composition is not used in combination with cationic surfactants.

The soil resistant composition according to the invention may be applied to a clean floor surface using an autoscrubber, flat mop, string mop, spray dispenser or other conventional application methods. A surface to be treated according to the invention may be cleaned using cleaning agents or solvents that will be familiar to those skilled in the art. The method may further include allowing the composition to dry and form a continuous or discontinuous film, layer or coating after applying to a clean floor surface. According to an embodiment of the invention, the soil resistant floor treatment composition is allowed to remain on the floor surface for sufficient period of time to enable formation of a substantially dry-to-touch coating. Preferably the coating is water resistant, more preferably the coating is water resistant and has low water solubility. The dry-to-touch coating formed by the soil resistant floor treatment composition is adhered or bonded to the clean surface and exhibits soil resistant properties minimizing and/or preventing bonding of soils to the surface.

In addition, the step of removing soils from the treated floor surface may further include applying a water source, a cleaning agent and/or mechanical force to remove soils. For example, the use of non-traditional mechanical force, such as compressed air or a vacuum can be utilized to clean the treated floor surface. In an embodiment of the invention, soil on the treated surface is removed using compressed air, alone or combined with water. The step of removing soils from the treated floor surface may not require a detergent composition for the removal of soils and/or cleaning of the treated surface to maintain soil repellency or resistance of the surface. However, soil can be removed with a cleaning agent if desired.

As a result, the treated floor surface can be cleaned without causing removal of the soil resistant coating, for extended periods of time. The treated floor surface can be cleaned, for example with a deliberate flow of water, such as from a hose or a natural source such as rain for external surfaces, without the need to reapply the soil repellant copolymer composition, for example, for several weeks and even months. When desirable, additional soil resistant floor treatment compositions may be applied to a cleaned surface to provide ongoing soil repellency. Alternatively or additionally, the soil resistant floor treatment composition may be combined with one or more detergent compositions and can be applied, for example, daily, weekly or as needed.

Kits

According to a further embodiment of the invention, the soil resistant floor composition of the invention can be packaged and provided as a kit for soil resistant floor treatments. According to an embodiment of the invention, a kit may comprise, consist of and/or consist essentially of the soil resistant composition according to the invention, an applicator, a removal agent for removing a plurality of soils from a treated floor surface, and suitable instructions for use.

Example applicators include but are not limited to: a scrubber, a mop, a roller or a spray. Examples of suitable scrubbers include manual and auto floor scrubbers. Examples of suitable mops include string and flat mops.

In one embodiment, the kit includes the soil resistant composition and a separate cleaning agent that may be optionally combined with the soil resistant composition prior to use. In another embodiment, at least one amphoteric acrylic copolymer may be provided with the soil resistant composition or the cleaning agent or may be provided separate.

In a further embodiment, the cleaning system comprises a container, within which is a copolymer of maleic and olefin having a molecular weight from approximately 1,000 to 20,000 g/mol, optionally at least one detergent, and optionally at least one amphoteric acrylic copolymer. In a still further embodiment, the cleaning system comprises a first container and a second container. The first container may hold a copolymer of maleic and olefin having a molecular weight from approximately 1,000 to 20,000 g/mol and the second container may hold at least one detergent. At least one amphoteric acrylic copolymer may be included in the first container, the second container or in the third container. In use, the contents of the containers may be diluted, and may be combined prior to or after dilution.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Materials Used

TABLE 1

| Material | Description | Vendor |
| --- | --- | --- |
| ES8804 | Maleic acid/Olefin-Copolymer | BASF |
| Capstone ST100 (ST100) | 19-20% active solids, aqueous fluorochemical dispersion | DuPont |
| Capstone ST300 (ST300) | 15% active solids, aqueous fluorochemical dispersion | DuPont |
| Wacker HC 303 (HC 303) | ~17% solids, finely dispersed water based silicone emulsion | Wacker Silicones |
| StoneMedic ASI Absorbent Stone Impregnator | Water based impregnator that is designed to give protection against both water and oil borne stains on absorbent natural stone, terrazzo, concrete and grout. | Ecolab |
| Stone Medic DCC | Fatty Acid based natural stone cleaner and conditioner for daily use | Ecolab |
| NeoMat Forte | Fatty Acid based cleaner | Ecolab |
| NeoMat S | Fatty Acid based cleaner | Ecolab |
| Bindzil CC30 (CC30) | Colloidal silica solution | Akzo Nobel |
| Lithisil 25 | Lithium silicate, 23% solution in water | PQ Corporation |

TABLE 1-continued

| Material | Description | Vendor |
| --- | --- | --- |
| PolyQuart Pro | An acrylic copolymer | Cognis |
| EZ Clean 200 | Acrylic emulsion | Dow |
| Sokalon CP9 granulate | Maleic acid/Olefin-Copolymer, Na-salt | BASF |
| Acusol 929 | Acrylic acid homopolymer (43-47%) | Dow |
| Prifac 7908 | Palm kernel based fatty acid | Croda |
| Potassium hydroxide | 45% liquid form | Various sources |
| Ethylenediaminetetraacetic Acid (EDTA) | 47% liquid form | Various sources |

White Concrete Grout Coupon Preparation:

Tap water (19.32%) was mixed with PolyBlend Sanded Grout mix (80.68%), Bright White #381, manufactured by Custom Building products. A mold was filled with the mixture to form 2" by 2" coupons. The coupons were ready to use after 5-7 days ambient curing.

Black Oily Soil Preparation:

The materials set forth below in Table 2 were placed in a beaker and mixed with a stirbar for at least 10 minutes to form a uniform black oily soil.

TABLE 2

| Material | weight (g) |
| --- | --- |
| Mineral Spirits | 50.00 |
| Mineral Oil | 5.00 |
| 10/30 W Motor Oil | 5.00 |
| Oil Dag (Graphite Lube) | 2.50 |
| Bandy Black Clay | 37.50 |

Red Wine Stain:

Cellared and bottled by Charles Shaw Winery, Napa and Sonoma, Calif., Contains sulfites, ALC: 12.5% by vol.

Example 1

StoneMedic DCC, NeoMat S and NeoMat Forte were diluted with tap water to 1.2 wt % and an equal active amount of soil resistant agent was added to prepare Experiments 1-12 as set forth in Table 3.

TABLE 3

| | Weight (g) | | | | | |
| --- | --- | --- | --- | --- | --- | --- |
| Experiments | 1.2% DCC | 1.2% NeoMat Forte | 1.2% NeoMat S | ES8804 (25% active) | HC303 (17% active) | ST300 (15% active) |
| #1 | 25.00 | | | | | |
| #2 | 24.66 | | | 0.34 | | |
| #3 | 24.50 | | | | 0.50 | |
| #4 | 24.43 | | | | | 0.57 |
| #5 | | 25.00 | | | | |
| #6 | | 24.66 | | 0.34 | | |
| #7 | | 24.50 | | | 0.50 | |
| #8 | | 24.43 | | | | 0.57 |
| #9 | | | 25.00 | | | |
| #10 | | | 24.66 | 0.34 | | |
| #11 | | | 24.50 | | 0.50 | |
| #12 | | | 24.43 | | | 0.57 |

For each experiment, a white concrete grout coupon was divided evenly into two sections. Each section was treated with 1.3 g of the diluted cleaner and dried overnight. A foam ring having an open center diameter of about 0.5 inch with a thickness of about 0.125 inch was applied onto the treated surface. The ring center open area was filled with the red wine for 10 minutes. After 10 minutes, the wine inside the ring was removed with a dry paper towel, followed by a wet wiping of the grout surface. The tested area was then wiped with a dry paper towel.

The degree of stain of the grout was evaluated by visual appearance as well as by Wb and L value measurement with a BYK Gardner SpectroGuide. Table 4 below provides the Wb and L data for each Experiment. A higher delta Wb or delta L value represents a poorer stain resistance, as the delta value is calculated by non soiled value—soiled value.

TABLE 4

| Ex 1- | cou-pon | non-soiled area L | Wb | soiled area L | Wb | delta (non-soiled − soiled) L | Wb |
|---|---|---|---|---|---|---|---|
| #1  | 1 | 92.65 | 62.02 | 67.83 | 6.03  | 24.82 | 55.99 |
| #2  |   | 91.91 | 58.07 | 84.06 | 31.5  | 7.85  | 26.57 |
| #3  | 2 | 91.71 | 57.77 | 90.33 | 50.18 | 1.38  | 7.59  |
| #4  |   | 92.85 | 63.97 | 82.08 | 37.07 | 10.77 | 26.9  |
| #5  | 3 | 93.38 | 63.02 | 66.81 | 0.16  | 26.57 | 62.86 |
| #6  |   | 92.69 | 64.33 | 65.59 | 8.9   | 27.1  | 55.43 |
| #7  | 4 | 92.87 | 64.85 | 69.29 | 11.03 | 23.58 | 53.82 |
| #8  |   | 92.97 | 64.72 | 69.29 | 11.03 | 23.68 | 53.69 |
| #9  | 5 | 93.39 | 70.48 | 74.16 | 14.53 | 19.23 | 55.95 |
| #10 |   | 93.05 | 64.7  | 90.71 | 52.54 | 2.34  | 12.16 |
| #11 | 6 | 94.24 | 77.25 | 90.38 | 57.8  | 3.86  | 19.45 |
| #12 |   | 94.24 | 77.25 | 90.38 | 57.8  | 3.86  | 19.45 |

These results demonstrate that the addition of ES8804 according to Examples 2, 6 and 10 to a soap based cleaner can reduce surface soiling of pre-treated surfaces. The data also indicates that Experiments 2, 6, and 10 performed comparably to other commercially available stain resistant agents including HC303 and ST300 at the same activity level.

Example 2

For Experiments 13-24, coupons were prepared with the same cleaner solutions as Experiments 1-12, respectively. One application of each composition was applied evenly over white grout coupons with an application rate of 2.6 g/in² per coupon. The treated grout coupons were allowed to dry for at least 12 hours.

An oily soil mixture was applied to the pretreated grout coupons using a foam brush with two passes in perpendicular directions. The soiled grout coupons were dried for at least 12 hours. The soiled grout coupons were placed into cut outs in a customized Gardner Abrader template which was placed into the Gardner Abrader tray. The test coupons were submerged in 220 g of tap water in the Gardner Abraser Tray for one minute. A 1"×2¾"×3¾" yellow 33PP1 DC sponge supplied by Reilly Foam Corporation was loaded into the Gardner Abrader carriage with no extra loaded weight, and was passed over each test coupon for 10 cycles. Coupon images were analyzed with Fiji image analysis software to compare median color values among the test samples. Table 5 shows the median color value of the Experiments 13-24 with a higher color value indicating a whiter coupon surface. The higher the median color value or the whiter the test coupon after cleaning, the more soil resistant properties the cleaner imparted to the sample coupon.

TABLE 5

| EX 13-24 | Median Color Value |
|---|---|
| 13 | 176 |
| 14 | 161 |
| 15 | 182 |
| 16 | 223 |
| 17 | 206 |
| 18 | 191 |
| 19 | 184 |
| 20 | 215 |
| 21 | 169 |
| 22 | 185 |
| 23 | 192 |
| 24 | 214 |

This example demonstrates that the surface treated with a soil resistant agent in a soap based cleaner can reduce surface soiling and improve ease of cleaning.

Example 3

NeoMat S was diluted with tap water to 1.2 wt % and an equal active amount of soil resistant agents was added to prepare Experiments 25-28 as set forth in Table 6.

TABLE 6

| | Weight (g) | | | |
|---|---|---|---|---|
| Experiments | 1.2% NeoMat S | ES8804 (25% active) | HC303 (17% active) | ST300 (15% active) |
| #25 | 25.00 |      |      |      |
| #26 | 24.66 | 0.34 |      |      |
| #27 | 24.50 |      | 0.50 |      |
| #28 | 24.43 |      |      | 0.57 |

One application of each composition was applied evenly over white grout coupons with an application rate of 2.6 g per coupon. The treated grout coupons were allowed to dry for at least 12 hours.

An oily soil mixture was applied to the pretreated grout coupons using a foam brush with two passes in perpendicular directions. The soiled grout coupons were dried for at least 12 hours. The soiled grout coupons were placed into cut outs in a customized Gardner Abrader template which was placed into the Gardner Abrader tray. The test coupons were submerged in 220 g of tap water in the Gardner Abraser Tray for one minute. A 1"×2¾"×3¾" yellow 33PP1 DC sponge supplied by Reilly Foam Corporation was loaded into the Gardner Abrader carriage with no extra loaded weight, and was passed over each test coupon for 10 cycles. Coupon images were analyzed with Fiji image analysis software to compare median color values among the test samples as shown in Table 7. Table 7 shows the median color value of the Experiments 25-28, with a higher color value indicating a whiter coupon surface. The higher the median color value, the whiter the test coupon after cleaning and the more soil resistant properties the cleaner imparted to the sample coupon.

TABLE 7

| Experiments | Median Color Value |
|---|---|
| 25 | 180 |
| 26 | 218 |
| 27 | 200 |
| 28 | 212 |

This example demonstrates that Experiment 26 including ES8804, Experiment 27 including HC303 and experiment 28 including ST300 can reduce surface soiling and increase the ease of cleaning.

Example 4

For Experiments 29-34, grout coupons were treated with aqueous solutions containing 0.05% active of the additive set forth in Table 8. The grout was treated with 1.3 g per ½ coupon of the solution, and 2 applications were carried out for each condition. The red wine soiling procedure and the white concrete grout coupon preparations were the same as described in Example 1.

TABLE 8

| | Exp. | | | | |
|---|---|---|---|---|---|
| | #29 | #30 | #31 | #32 | #33 |
| Additive | ES8804 (25% active) | Bindizil CC30 (30% active) | Lithisil 25 (23% active) | Capstone ST100 (20% active) | Capstone ST300 (15% active) |

Both red wine stain and water repelling were evaluated. The water repelling ability of the surface after the treatment was carried out by placing a water drop on the surface and observing the droplet disappearance absorbed by the coupon. Table 9 shows the Wb values of the Experiments, with a Lower Delta Wb indicating better stain resistance.

TABLE 9

| Exp | Wb non soiled | Wb soiled | Delta Wb (non soiled − soiled) |
|---|---|---|---|
| #29 | 59.61 | 42.23 | 17.38 |
| #30 | 48.95 | 6.62 | 42.33 |
| #31 | 65.97 | 8.24 | 57.73 |
| #32 | 62.55 | 42.10 | 20.45 |
| #33 | 61.32 | 47.24 | 14.08 |

The above results showed that Experiment 29 including ES8804, had equivalent or better red wine stain resistance when compared to various commercially available products ST100 and ST300. ES8804 also outperformed Experiments 30 (colloidal silica) and 31 (concrete densifier). Water repelling tests showed similar results, with Experiments 29, 32 and 33 exhibiting water beading while Examples 30 and 31 absorbed the water. This example demonstrates that the red wine soil resistance of a porous surface can be significantly improved with ES8804.

Example 5

The test evaluated soil resistance of white grout coupons treated with various cleaner formulations set forth in Table 10, soiled with the black oily soil, cleaned via the Gardner Abraser with water, and evaluated by analyzing a scanned image of the coupons with Fiji Image Analysis Software. The procedure was the same as that described in Example 2 except that a second application of the cleaner was applied to the sample coupon at least one hour after the first application.

TABLE 10

| EX | ES8804 (uL) | PolyQuart Pro (uL) | ST-100 (uL) | mL water | Total ppm of additive |
|---|---|---|---|---|---|
| 34 | 200 | 0 | 0 | 999.8 | 50 |
| 35 | 400 | 0 | 0 | 999.6 | 100 |
| 36 | 4000 | 0 | 0 | 996 | 1000 |
| 37 | 8000 | 0 | 0 | 992 | 2000 |
| 38 | 0 | 217 | 0 | 999.783 | 50 |
| 39 | 0 | 435 | 0 | 999.565 | 100 |
| 40 | 0 | 4348 | 0 | 995.652 | 1000 |
| 41 | 0 | 8696 | 0 | 991.304 | 2000 |
| 42 | 0 | 0 | 333 | 999.667 | 50 |
| 43 | 0 | 0 | 667 | 999.333 | 100 |
| 44 | 0 | 0 | 6667 | 993.333 | 1000 |
| 45 | 0 | 0 | 13333 | 986.667 | 2000 |
| 46 | Water Control | | | | |
| 47 | Water Conrol | | | | |

Table 11 shows the median color value of the Experiments, with a higher color value indicating a whiter coupon surface. The higher the median color value, the whiter the test coupon after cleaning and the more soil resistant properties the cleaner imparted to the sample coupon.

TABLE 11

| EX | Median Color Value |
|---|---|
| 34 | 146 |
| 35 | 180 |
| 36 | 176 |
| 37 | 154 |
| 38 | 157 |
| 39 | 171 |
| 40 | 170 |
| 41 | 196 |
| 42 | 150 |
| 43 | 159 |
| 44 | 188 |
| 45 | 200 |
| 46 | 170 |
| 47 | 154 |

The results show that ES8804 at 100-1000 ppm concentration (Examples 35-36) had a better soil repelling ability than the water control. ES8804 also showed similar or better soil removal than ST100 and Polyquart Pro at the same concentration.

Example 6

The concentrate formulations set forth in Table 12 below were used to prepare Experiments 48-63 as set forth in the Table 13 below. Formulations 1-4 each included Polyquart Pro, a commercially available acrylic based cleaner from Cognis Corporation. Formulation 5 did not use Polyquart Pro, and experiments using Formulation 5 are labeled as comparative examples. The various components for each experiment were combined and shaken for 15 seconds.

TABLE 12

| Description | Form 1 | Form 2 | Form 3 | Form 4 | Form 5 |
|---|---|---|---|---|---|
| Water Deionized TNK | 45.00 | 45.00 | 45.00 | 45.00 | 45.00 |
| Polyquart Pro (22%) | 7.13 | 3.56 | 1.78 | 0.89 | 0.00 |
| EDTA (47%) | 0.75 | 0.75 | 0.75 | 0.75 | 0.75 |
| Palm Kernel Based Fatty Acid (Prifac 7908) | 18.00 | 18.79 | 19.18 | 19.37 | 19.57 |
| Potassium Hydroxide, 45% Liquid | 9.12 | 9.54 | 9.73 | 9.83 | 9.93 |
| Water Deionized TNK | 20.00 | 22.37 | 23.56 | 24.16 | 24.75 |

TABLE 13

| Experiment | Formulation | Tap water by wt. (g) | Formula by wt (g) | 1% ES8804 in water by wt (g) | 1% EZ Clean 200 in water by wt (g) |
|---|---|---|---|---|---|
| 48 | Formula 1 | 222.30 | 2.70 | 0.00 | 0.00 |
| 49 | Formula 2 | 222.30 | 2.70 | 0.00 | 0.00 |
| 50 | Formula 3 | 222.30 | 2.70 | 0.00 | 0.00 |
| 51 | Formula 4 | 222.30 | 2.70 | 0.00 | 0.00 |
| Comp. 52 | Formula 5 | 222.30 | 2.70 | 0.00 | 0.00 |
| 53 | Formula 1 | 211.04 | 2.70 | 11.26 | 0.00 |
| 54 | Formula 2 | 211.04 | 2.70 | 11.26 | 0.00 |
| 55 | Formula 3 | 211.04 | 2.70 | 11.26 | 0.00 |
| 56 | Formula 4 | 211.04 | 2.70 | 11.26 | 0.00 |
| Comp. 57 | Formula 5 | 211.04 | 2.70 | 11.26 | 0.00 |
| 58 | Formula 1 | 216.25 | 2.70 | 0.00 | 6.05 |
| 59 | Formula 2 | 216.25 | 2.70 | 0.00 | 6.05 |
| 60 | Formula 3 | 216.25 | 2.70 | 0.00 | 6.05 |
| 61 | Formula 4 | 216.25 | 2.70 | 0.00 | 6.05 |
| Comp. 62 | Formula 5 | 216.25 | 2.70 | 0.00 | 6.05 |
| 63 | Water Control | | | | |

White grout coupons prepared as described above were treated with one application of each composition in table 4. The cleaner compositions were applied evenly over white grout coupons with an application rate of 2.6 g per coupon. The treated grout coupons were allowed to dry for at least 12 hours.

The cleaner treated grout coupons were soiled with two perpendicular passes of a foam brush coated with a black oily soil mixture. The soiled coupons were placed in a Gardner Abraser tray and submerged in 220 g of cleaning solution. Each of Experiments 15-30 was used to treat at least one soiled coupon. A yellow 33PP1 DCV sponge from Reilly Foam Corporation was loaded into the Gardner abraser carriage with no extra loaded weight and the sponge was passed over the coupon for 10 cycles. The coupon was then removed and air dried for 24 hours.

An image of each coupon was then scanned as a color "jpeg" image at 300 dpi. Fiji image analysis software was used to determine the median color values of the coupons. A higher color value indicates a white group coupon, meaning better cleaning performance. The results are set forth in table below 14.

TABLE 14

| Condition | Median Color Value |
|---|---|
| 48 | 255 |
| 49 | 254 |
| 50 | 215 |
| 51 | 219 |
| Comp. 52 | 204 |
| 53 | 239 |
| 54 | 254 |
| 55 | 249 |
| 56 | 255 |
| Comp. 57 | 231 |
| 58 | 241 |
| 59 | 252 |
| 60 | 253 |
| 61 | 228 |
| Comp. 62 | 202 |
| 63 | 165 |

A number of observations can be made from these results. The results demonstrate that the control (water) had the lowest cleaning efficiency. Of the compositions that included cleaner, Experiments 54-56, including a combination of ES8804 and Polyquart Pro having its concentrations in the range of 3.56-0.89% wt in the formula, Experiments 59-60 (EZ Clean 200 and Polyquart Pro having its concentrations in the range of 3.56-1.78% weight in the formula) and Experiments 48-49 (Polyquart Pro only with its concentrations in the range of 7.13-3.56 wt % in the formula) had the highest overall cleaning efficiency. The Comparative Experiments, 52, 57 and 62, not including Polyquart Pro did not perform as well as the same Experiments with Polyquart Pro.

Additionally, Experiments 55-56 containing ES8804 and 61-62 containing EZ Clean 200 had high cleaning efficiency despite having a reduced concentration of Polyquart Pro. In comparison, Experiments 50-51 with reduced Polyquart Pro concentrations and no ES8804 or EZ Clean 200 had significantly lower cleaning efficiency. Furthermore the two Comparative Experiments 57 and 62 containing no Polyquart Pro, but ES8804 or EZ Clean 200, had a reduced cleaning efficiency in contrast to compositions also containing Polyquart Pro. The results clearly indicated that the combination of Polyquart Pro and ES8804 or EZClean 200, at certain component concentration ranges, can significantly improve the cleaning efficiency over the compositions containing Polyquat Pro only or the soil resistant agent only.

Moreover the experimental results also demonstrated that the addition of Polyquart Pro to a fatty acid based cleaner had significantly improved soil removal ability. (Experiments 48-51 in contrast to Experiment 18). A similar result was obtained by comparing Experiment 57 to Experiment 52 demonstrating that the addition of ES8804 to the fatty acid based cleaner significantly increased the cleaning efficiency.

Example 7

A 5% wt aqueous solution of ES8804 in DI water was prepared. A 4"×4" marble tile was placed on a leveled surface, and 2.0 g of solution was applied to the marble surface to ensure the solution was evenly spread over the entire surface of the tile. The solution was dried on the surface overnight. A foam ring having an open center diameter of 0.5 inch and a thickness of 0.125 inch was adhered to the treated marble tile and to a non-treated marble tile. The ring center open area was filled with regular Coca Cola, which was allowed to dwell on the tile surfaces for 5 minutes. The Coca Cola was then removed with a dry paper towel, followed by a wet wiping of the tile surface. The tested area was then wiped again with a dry paper towel. The degree of etch for the marble tile surface shown in Table 15 was measured with a BYK Gardner SpectroGuide for a 60 degree gloss value averaged from 3 measurements. A lower gloss after etch indicates a higher degree of etch.

TABLE 15

| | Treated Area | Non-Treated Area |
|---|---|---|
| 60 Degree gloss pre-etch | 65 | 65 |
| 60 Degree gloss post-etch | 51.9 | 39.8 |

The example demonstrates that a marble surface treated with ES8804 showed significantly reduced surface etch than the non-treated surface.

Example 8

Grout coupons were treated with aqueous solutions containing the additive set forth in Table below. Sokalan CP9 was dissolved in DI H2O to form a 25.0% solids aqueous solution (Sokalan CP9 25%) prior to making the use solution for grout treatment. All of the use solutions for grout treatment were made by mixing 0.20 g of the additive with tap water to a total weight of 100.0 g. The grout was treated with 1.3 g per ½ coupon of the solution, and 2 applications were carried out for each condition. The red wine soiling procedure and the white concrete grout coupon preparations were the same as described in Example 1.

TABLE 16

| | Exp. | | | | |
|---|---|---|---|---|---|
| | 64 | 65 | 66 | 67 | 68 |
| Additive | Sokalan CP9 (25%) | ES8804 | Acusol 929 | ES8804 | Tap H2O |
| Coupon # | Coupon 1 | Coupon 1 | Coupon 2 | Coupon 2 | Coupon 3 |

Table 17 shows the Wb and L values of the Experiments, with a Lower Delta value (non soiled—soiled) indicating better stain resistance.

TABLE 17

| Exp | Wb non soiled | Wb soiled | Delta Wb | L non soiled | L soiled | Delta L |
|---|---|---|---|---|---|---|
| 64 | 57.33 | 24.61 | 32.72 | 91.96 | 85.19 | 6.77 |
| 65 | 57.08 | 23.86 | 33.22 | 91.88 | 85.17 | 6.71 |
| 66 | 67.12 | 8.78 | 58.34 | 92.85 | 60.90 | 31.89 |
| 67 | 57.92 | 26.06 | 31.86 | 92.09 | 86.11 | 5.98 |
| 68 | 62.10 | 11.08 | 51.02 | 92.55 | 65.12 | 27.43 |

The above results showed that Experiment 64 having Sokalan CP9 and Experiments 65 and 67 including ES8804, significantly improved the red wine stain resistance when compared to the water treated coupon. This example demonstrates that the red wine soil resistance of a porous surface can be significantly improved with ES8804 and Sokalan CP9. This example also demonstrates that Sokalan CP9 performs substantially similar to ES8804.

The inventions described herein, may be varied in many ways. Such variations are not to be regarded as a departure from the spirit and scope of the inventions and all such modifications are intended to be included within the scope of the following claims.

What is claimed is:

1. A method for treating a clean floor surface comprising:
applying to the clean floor surface a soil resistant floor treatment composition comprising water and approximately 0.005 wt% to 20 wt% maleic/olefin copolymer, wherein the maleic/olefin copolymer has a molecular weight from approximately 1,000 to 20,000 g/mol and the copolymer is substantially free of fluorinated or silicone substituents, and further wherein the composition is free of detergents and surfactants;
drying the floor surface such that a coating comprising the soil resistant floor treatment composition is disposed on the floor surface; and
the floor surface is selected from the group consisting of marble, granite, terrazzo, concrete, ceramic, wood, laminate, linoleum, vinyl, cork, bamboo, rubber, and dry shake.

2. The method according to claim 1 further comprising a step of diluting the soil resistant floor treatment composition of claim 1 into a use solution before applying the composition to the floor surface.

3. The method according to claim 1 wherein the coating is a continuous or non-continuous coating.

4. The method according to claim 1 wherein the maleic/olefin copolymer molecular weight is from approximately 2,000 to 5,000 g/mol.

5. The method according to claim 1 wherein the maleic/olefin copolymer has a maleic/olefin ratio from approximately 1:4 to 4:1 on a molar basis.

6. The method according to claim 1 wherein the maleic/olefin copolymer has a maleic/olefin ratio from approximately 1:2 to 2:1 on a molar basis.

7. The method according to claim 1 wherein the maleic/olefin copolymer is hydrophobically modified.

8. The method according to claim 1 further comprising the step of removing soil from the floor surface after the step of applying the soil resistant floor treatment composition.

9. The method according to claim 8 wherein the removal of soil step includes application of a water source, cleaning agent and/or mechanical force.

10. The method according to claim 1 wherein the floor surface comprises a porous surface.

11. The method according to claim 1, wherein the composition comprises at least one alkalinity source selected from the group consisting of: alkali metal carbonates, earth metal carbonates, alkali metal hydroxides, earth metal hydroxides, and amines.

12. The method according to claim 1 wherein the composition further includes at least one amphoteric acrylic copolymer.

* * * * *